Patented May 7, 1929.

1,712,273

UNITED STATES PATENT OFFICE.

KENNETH B. KENNEDY, OF SAN DIEGO, CALIFORNIA.

PIPE COUPLING.

Application filed November 24, 1923. Serial No. 676,835.

My invention relates to pipe couplings, and the objects of my invention are: first, to provide such a coupling by which the ends of pipes may be coupled together without threading the same or by means of which a pipe may be coupled or secured to a fitting without threading the end of the pipe; second, to provide a coupling of this class which may be used to couple together pipes and fittings conducting water, steam, compressed air or any other fluid under considerable pressure; third, to provide a coupling of this class with which no plastic material, such as paint, is necessary on the threaded joints of the coupling members to insure leak-proof connections, but in which the joint is sealed by means of a gasket member compressed by the coupling members; fourth, to provide a coupling of this class by which pipes or pipes and fittings may be readily coupled or secured together by hand; fifth, to provide such a coupling by which pipes or pipes and fittings may be quickly coupled together or separated from each other as desired; sixth, to provide a novelly constructed coupling of this class, and seventh, to provide such a coupling which is very simple and economical of construction proportionate to its functions, durable, and which will not readily deteriorate or get out of order.

Figure 1:
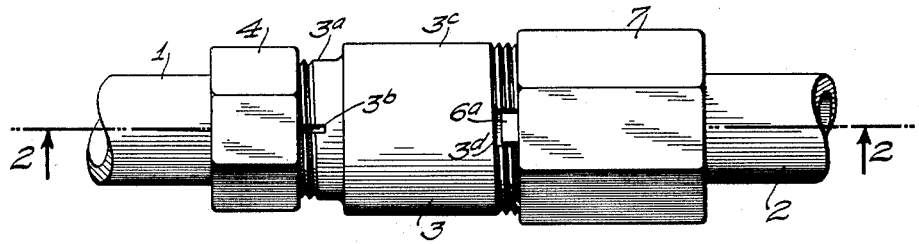
Figure 2:
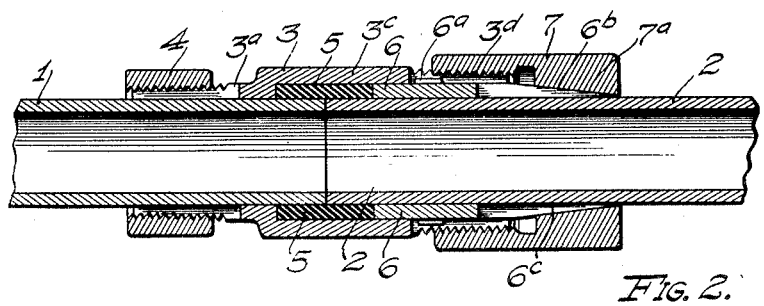
Figure 3:
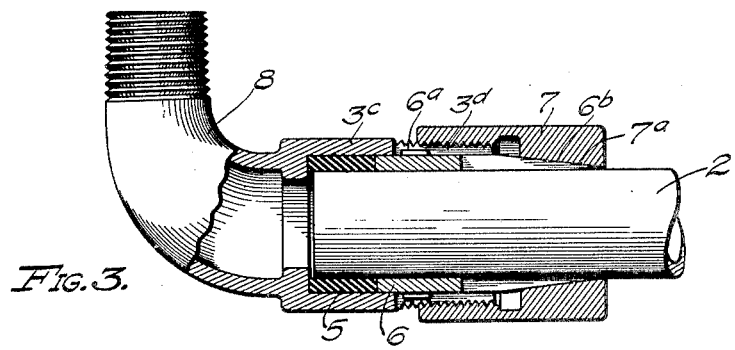
Figure 4:
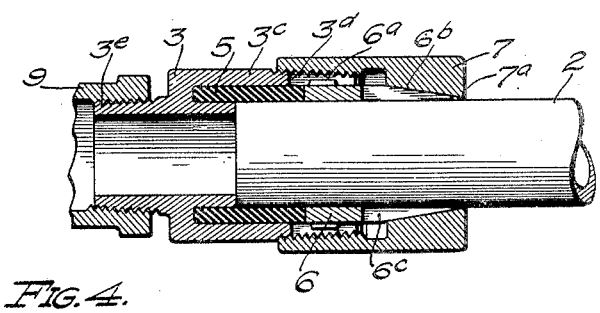

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side view of my pipe coupling securing the ends of two pipe members together, showing the pipe members fragmentarily; Fig. 2 is a longitudinal sectional view thereof taken through 2—2 of Fig. 1; Fig. 3 is a sectional view of my coupling, showing the same coupling the end of a pipe member with the one end of an L, showing the section of the coupling taken through the middle thereof and showing the L partly in section to facilitate the illustration, and Fig. 4 is a sectional view of a slightly modified form of construction of my coupling, showing the same coupling the end of a pipe with an internally threaded fitting, such as a valve.

Like characters of reference refer to similar parts and portions throughout the several views of the drawings.

The pipe members 1 and 2, coupling member 3, nut 4, gasket member 5, sleeve 6, and the nut 7, constitute the principal parts and portions of my coupling structure in one form.

The coupling member 3 extends over the adjacent ends of the pipe members 1 and 2 and is offset at its middle portion, the smaller portion $3^a$ thereof being provided with a bore of substantially the diameter of the pipe member 1 through which the said pipe member extends. Said portion $3^a$ is provided with external pipe threads and with longitudinal slots $3^b$ extending therein from the end thereof. Over the threaded end of the portion $3^a$ is provided an internally threaded nut 4, which is adapted to contract the slotted end of said portion $3^a$ around and frictionally secure the same to the pipe member 1. The other enlarged portion $3^c$ of the coupling member 3 is also externally pipe-threaded at its outer end and is provided at said end with a nut 7 adapted to be screwed thereon. Said portion $3^c$ is also provided with a pair of relatively wide, oppositely disposed slots $3^d$ extending therein from its end. Within the enlarged portion $3^c$ of the coupling member 3 is positioned the cylindrical gasket member 5, the one end of which is positioned between the wall of the portion $3^c$ and the outer portion of the end of the pipe member 1, and the other end of which is positioned between the wall of the enlarged portion $3^c$ and the outer wall of the end of the pipe member 2, substantially as shown in Fig. 2 of the drawings. A sleeve 6 is positioned around the pipe member 2 within the enlarged portion of the coupling member 3 and against the one end of the gasket member 5. Said sleeve is provided with a pair of oppositely disposed lugs $6^a$ which extend into the slots $3^d$ in the enlarged portion 3ᶜ of said coupling member, and which lugs prevent said sleeve from rotating relatively to the pipe member 2, the gasket member 5 and the coupling member 3. The outer end of the sleeve 6 is provided with a tapered portion 6ᵇ and also with longitudinal slots 6ᶜ, which extend therein from the tapered end of the sleeve. The nut 7 is also provided with a tapered portion 7ᵃ at the outer end of its interior portion, which conforms with the tapered portion 6ᵇ of the sleeve 6 and is adapted to contract said sleeve around the pipe member 2 when the nut is screwed on the externally threaded portion at the enlarged end of the coupling member 3.

It will be seen that in order to secure the pipe members 1 and 2 together the reduced portion 3ᵃ of the coupling member 3 is positioned over the end of the pipe member 1 and secured in position by the nut 4, the pipe member 1 extending a short distance into the enlarged portion of said coupling member and into the gasket member 5 positioned in said enlarged portion. The pipe member 2, over the end of which is positioned the sleeve 6 and the nut 7, is then inserted into the enlarged portion of the coupling member 3 and into the other end of said gasket member, the sleeve 6 being also inserted into said coupling member with the lugs 6ᵃ thereof in line with the slots 3ᵈ of said coupling member. The nut 7 is then screwed on the threaded portion of the enlarged end of said coupling member drawing the sleeve 6 against said gasket member and contracting the same at the tapered portion thereof around the pipe member 2.

The structure shown in Fig. 3 shows the coupling member made an integral part of a street L 8 and the gasket member thereof positioned against a shoulder in said L, said shoulder being preferably extended inwardly a sufficient distance to prevent the pipe member 2 from extending too far therein. It will be noted from this structure that the pipe members 2 may be positioned within the enlarged portion of the coupling member of the L and secured thereto without threading the end of the pipe member 2.

The coupling member 3, as shown in the modified form of construction in Fig. 4 of the drawings, is provided with a reduced portion 3ᵉ at its one end, the external diameter of which is substantially the same as the pipe member 2 and is externally threaded and adapted to be screwed into the end of a valve or other fitting 9. Thus, it will be seen that a pipe member may be readily coupled with and secured to an internally threaded fitting of the same diameter without threading the end of the pipe.

It is obvious from this construction, as illustrated in the drawings and disclosed in the foregoing specification, that there is provided a pipe coupling as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. In a coupling for alined abutting pipes, a resilient tubular gasket member forming a relatively tight fit around and to either side of the joint formed by said pipes, a relatively long, cylindrical coupling member positioned over said gasket, the one end portion thereof being reduced in diameter to fit closely around one of said pipes, and forming a shoulder for registering the inner end of said gasket, said end portion having external threads and longitudinal slots, a nut engageable with said threads for contracting said end portion into binding engagement with said pipe, a longitudinally slidable sleeve positioned within said coupling and around said other pipe, and in abutting engagement with the outer end of said gasket, means for preventing rotation of said sleeve relative to said coupling, a contracting nut engageable with external threads in the other end portion of said coupling for shifting said sleeve against said gasket and compressing the latter around the joint formed by the abutting pipes, the outer end of said sleeve being tapered and slotted longitudinally, said contracting nut having a correspondingly internally tapered portion adapted to engage said sleeve and contract same in binding engagement with said pipe when said gasket is compressed.

2. In a coupling for alined abutting pipes, a resilient tubular gasket member forming a relatively tight fit around and to either side of the joint formed by said pipes, a relatively long, cylindrical coupling member positioned over said gasket, the one end portion thereof being reduced in diameter to fit closely around one of said pipes, and forming a shoulder for registering the inner end of said gasket, said end portion having external threads and longitudinal slots, a nut engageable with said threads for contracting said end portion into binding engagement with said pipe, a longitudinally slidable sleeve positioned within said coupling and around said other pipe, and in abutting engagement with the outer end of said gasket, said sleeve having a longitudinally slotted tapered portion, the other end of said coupling having external threads and a pair of longitudinal slots, radially extending lugs on said sleeve extending into said slots for preventing rotational movement of said sleeve relative to said coupling, a contracting nut engageable with said external threads for shifting said sleeve against said gasket, said nut having an internally tapered portion engageable with the tapered portion of said sleeve and effecting binding engagement of said sleeve with said other pipe when said gasket is compressed.

In testimony whereof, I have hereunto set my hand at San Diego, California, this 17th day of November, 1923.

KENNETH B. KENNEDY.